United States Patent
Whitener et al.

(10) Patent No.: US 6,664,679 B2
(45) Date of Patent: Dec. 16, 2003

(54) DYNAMOELECTRIC MACHINE INCLUDING INSULATOR AND ASSOCIATED METHODS

(75) Inventors: Randy Edward Whitener, Orlando, FL (US); Kevin Michael Light, Maitland, FL (US); William Cannon Gardner, Rock Hill, SC (US); Stephen Thomas Soto, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/143,240

(22) Filed: May 10, 2002

(65) Prior Publication Data

US 2003/0209947 A1 Nov. 13, 2003

(51) Int. Cl.[7] .............................................. H02K 11/00
(52) U.S. Cl. .......................... 310/71; 310/231; 310/261
(58) Field of Search .......................... 310/71, 231, 234, 310/261

(56) References Cited

U.S. PATENT DOCUMENTS

| 4,038,574 | A | * | 7/1977 | Crow et al. ................. 310/71 |
| 4,588,911 | A | * | 5/1986 | Gold ............................ 310/62 |
| 4,616,149 | A | * | 10/1986 | Best ............................. 310/71 |
| 5,122,696 | A | | 6/1992 | Shih et al. .................... 310/71 |
| 5,313,129 | A | * | 5/1994 | Stewart ....................... 310/90 |
| 5,358,432 | A | | 10/1994 | Shih et al. ................. 439/825 |
| 5,382,855 | A | | 1/1995 | Cousin ........................ 310/71 |
| 5,661,352 | A | * | 8/1997 | Oguchi et al. ............... 310/71 |
| 6,020,670 | A | | 2/2000 | Jones et al. ................ 310/270 |

* cited by examiner

Primary Examiner—Thanh Lam

(57) ABSTRACT

A dynamoelectric machine 20 includes a rotor assembly 24 and a main lead insulating assembly 26. The rotor assembly 24 includes a shaft 28 having a main lead receiving recess 32 in its outer surface, a rotor 30 mounted to the shaft 28, and a stator 22 surrounding the rotor 30. The main lead insulating assembly 26 lines the main lead receiving recess 32 and includes at least one insulating bottom block 34 axially secured to the shaft 28 and at least one insulating sidewall block 40 secured to the at least one insulating bottom block 34 with at least one interlocking joint 42. A main lead 35 is received in the main lead insulating assembly 26.

21 Claims, 3 Drawing Sheets

DYNAMOELECTRIC MACHINE INCLUDING INSULATOR AND ASSOCIATED METHODS

FIELD OF THE INVENTION

The field of the invention relates generally to electrical power devices, and, more particularly, to a dynamoelectric machine including a main lead insulator and associated methods.

BACKGROUND OF THE INVENTION

A dynamoelectric machine, such as an electrical power generator, typically includes a stator and a rotor, each having respective windings. The rotor is mounted to a rotatable shaft that is typically driven by steam or combustion. As the shaft rotates, the rotor turns within the stator to generate electrical power.

A pair of axial leads may extend axially in axial passageways within the shaft, each of the pair of axial leads connecting to respective radial leads extending through respective radial passageways opening outwardly from the shaft. The radial leads, in turn, may each connect to respective main leads that extend axially within respective main lead receiving recesses formed in the surface of the shaft. Each main lead connects to a set of windings on the rotor. The connected main, radial, and axial leads supply an excitation current from an exciter, also typically driven by the shaft, to the rotor windings to thereby produce the magnetic flux necessary for generating electrical power as the rotor turns within the stator.

In an electric power generator, for example, the shaft and rotor spin at considerable speeds during operation of the generator. Thus components like the windings and main leads are subject to significant centrifugal forces. The main leads may also be subject to axial forces as well. There is also considerable heat generated as a result of electrical current flowing through the windings of the rotor and stator that may lead to unequal thermal expansions of the components. It may be desirable, therefore, to pack the space between a main lead and the main lead receiving recess in which it extends so that the lead remains relatively well secured and insulated within the recess.

Moreover, to reduce centrifugal loading, newly designed leads are being made lighter, which, in turn has resulted in these leads having smaller cross-sections. This makes effective packing of a main lead within a main lead receiving recess even more difficult. Additionally, in-service lead failure frequently requires extensive shaft machining to remove arc-damaged material from the main lead receiving recess, which results in the main lead receiving recess being made larger. This increases the difficulty in adequately repacking the space between a main lead and the contours of the main lead receiving recess after the in-service failure has been corrected.

Conventionally the space has been filled with laminated mica sheets. Such sheets, however, tend to migrate axially along the shaft as the shaft rotates. The migration can be severe enough to require disassembly and repacking. Efforts have been made to address the problem of stress on the connection between the main lead and rotor windings induced as the shaft rotates. U.S. Pat. No. 6,020,770 to Jones et al., for example, provides a connector support block that is held by the rotor windings of a generator and into which the end of a main lead fits to limit deflection of the main lead near the point of connection to the rotor windings. There remains, however, a need for ways to more effectively pack the main lead and, more especially, to mitigate the axial migration of conventional packing, such as laminated mica sheets.

SUMMARY OF THE INVENTION

With the foregoing background in mind, it is therefore an object of the present invention to provide a rotor assembly, for example, having more effective packing of a main lead.

This and other objects, features, and advantages in accordance with the present invention are provided by a rotor assembly including an main lead insulating assembly into which the main lead is packed. More particularly, the rotor assembly may include a shaft that has a main lead receiving recess in the outer surface.

The main lead insulating assembly lines the main lead receiving recess and may include at least one insulating bottom block and at least one insulating sidewall block connected thereto. The at least one insulating bottom block may include at least one projection which is received in at least one corresponding recess in the shaft. The projection thereby restricts axial migration of the at least one insulating bottom block during rotor operation.

The at least one insulating sidewall block may be secured to and extend outwardly from the at least one insulating bottom block, such as with at least one interlocking joint. A main lead may be received in the main lead insulating assembly lining the main lead receiving recess.

The at least one insulating bottom block may be a single insulating block. The at least one insulating sidewall block may comprise a pair of spaced apart sidewall insulating blocks. The at least one insulating bottom block and the at least one insulating sidewall block may each comprise glass-epoxy.

The rotor assembly may further comprise at least one securing wedge also received in the main lead receiving recess radially outward from the main lead. The rotor assembly also may include an axial passageway, and, may further include a radial passageway connected to the axial passageway opening radially outwardly from the shaft. An axial lead may be received in the axial passageway, and a radial lead may be received in the radial passageway. The axial lead may connect to the radial lead, which, in turn, may connect to the main lead.

An additional aspect of the present invention pertains to a method for installing a main lead for a rotor assembly comprising a shaft having a main lead receiving recess in its outer surface and a rotor mounted to the shaft. The method may include lining the main lead receiving recess with a main lead insulating assembly. Lining of the main lead receiving recess may include securing at least one insulating bottom block to the shaft so as to be restricted at least in axial movement. The method may further include securing at least one insulating sidewall block to the at least one insulating bottom block to extend outwardly therefrom. The method additionally may include positioning the main lead in the main lead insulating assembly.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
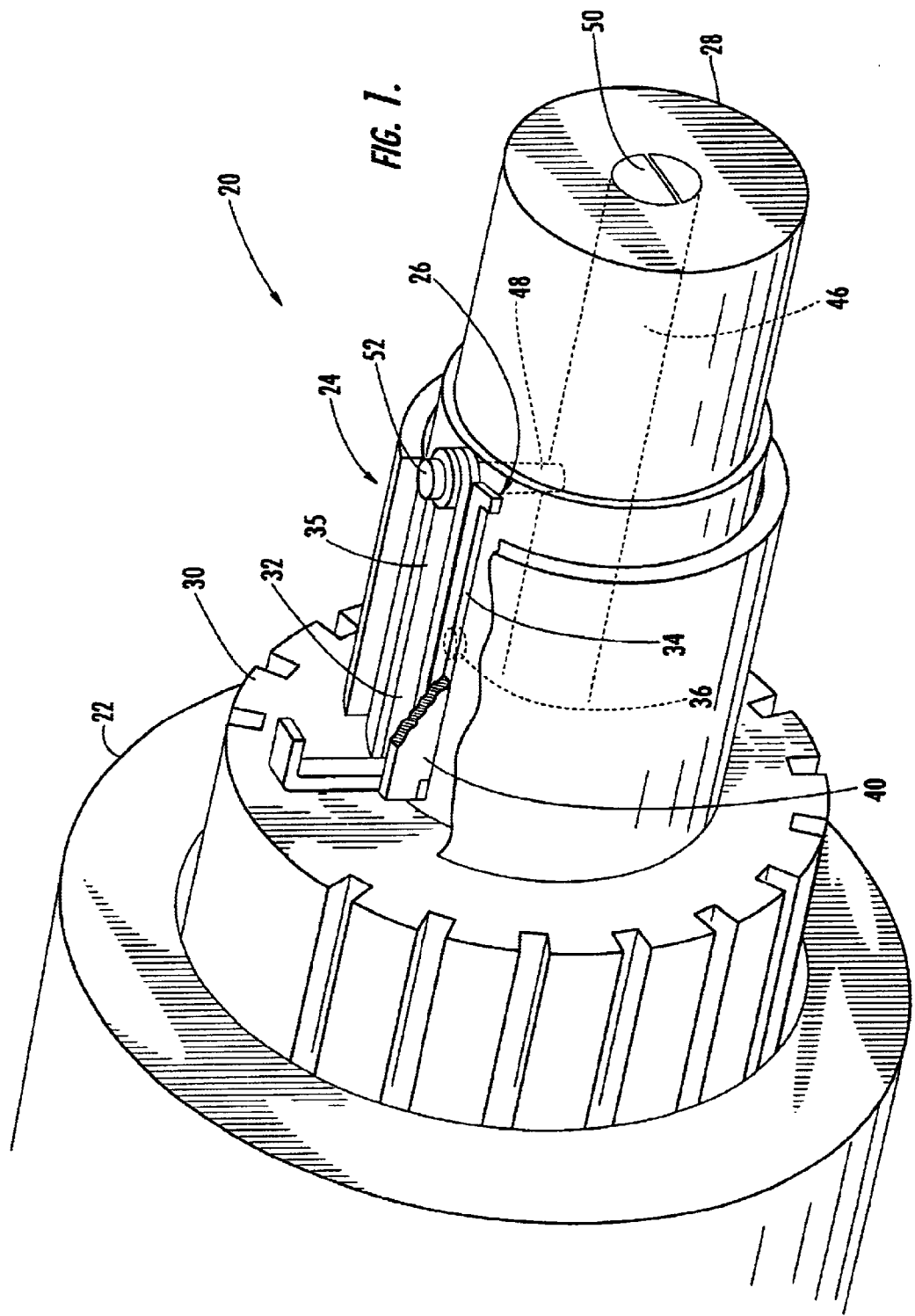
FIG. 1 is fragmentary view of a rotor assembly of a dynamoelectric machine in accordance with the present invention.
Figure 2:
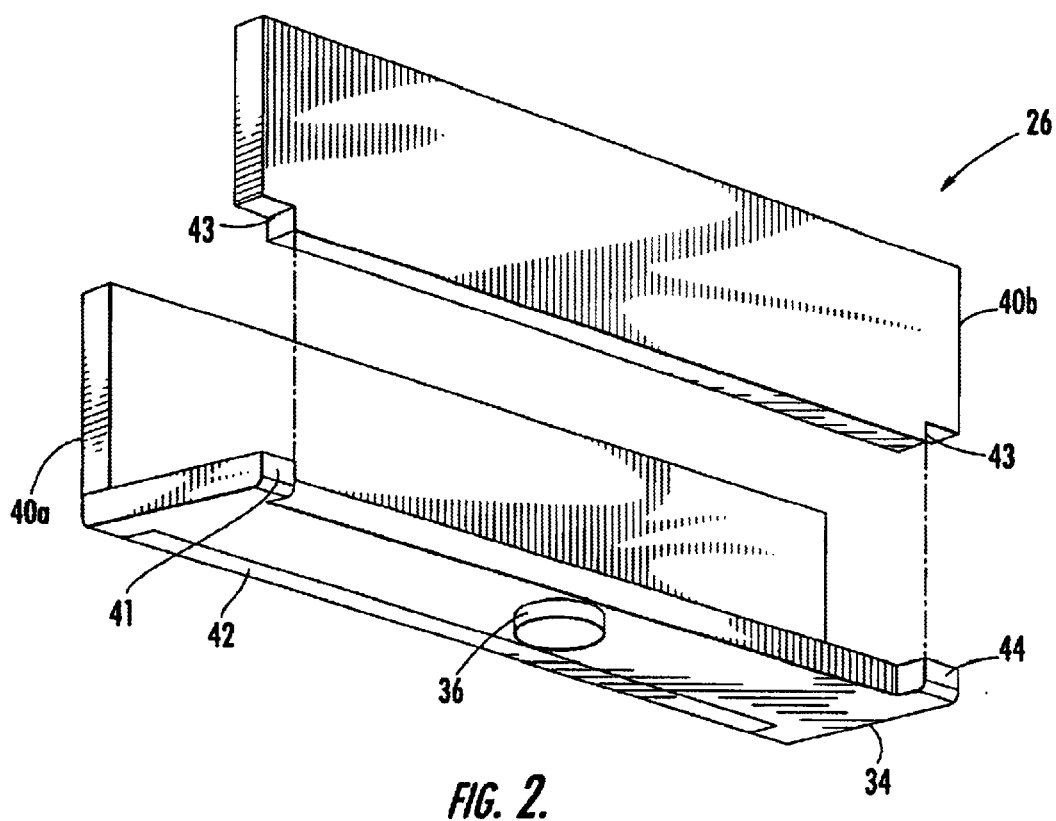
FIG. 2 is a partially exploded view of the main lead insulating assembly of FIG. 1.
Figure 3:
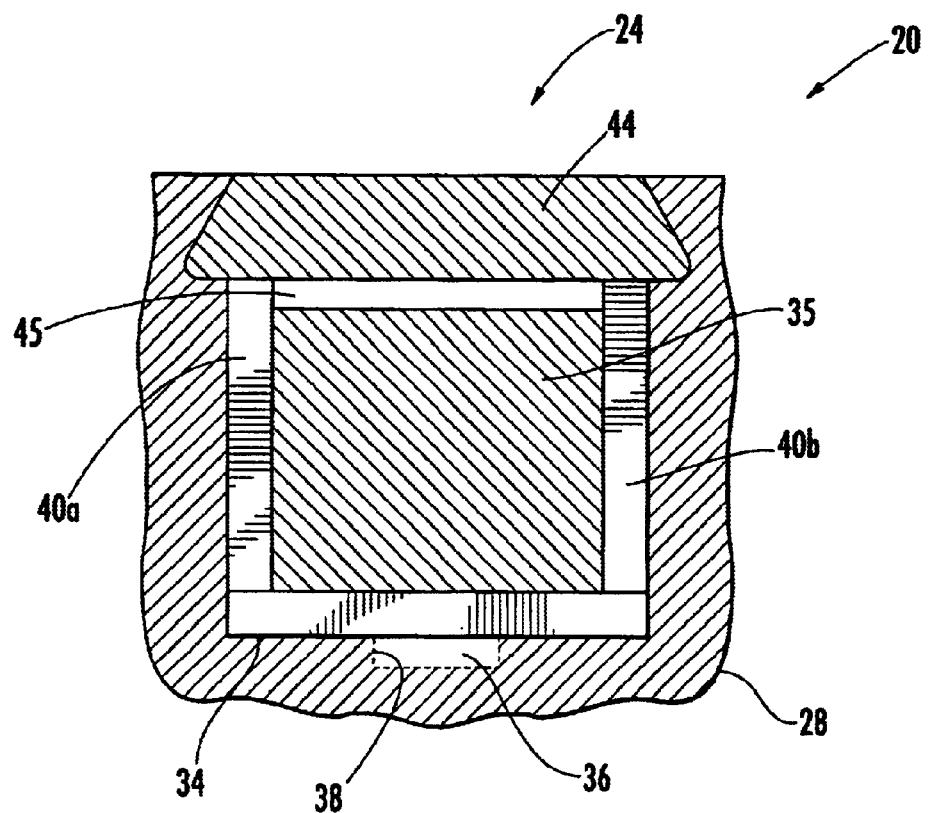
FIG. 3 is a transverse cross-sectional view of the main lead and main lead insulating assembly as shown in FIG. 1.

Referring to FIGS. 1–3, a dynamoelectric machine 20 including a stator 22, rotor assembly 24, and main lead insulating assembly 26 according to the invention are now described. The rotor assembly 24 includes a shaft 28 and a rotor 30 mounted to the shaft, the rotor rotating within the stator 22 when driven by the shaft. The shaft 28 illustratively includes a main lead receiving recess 32 in an outer surface of the shaft. The main lead insulating assembly 26 lines the main lead receiving recess 32, and a main lead 35 is received in the main lead insulating assembly.

The main lead insulating assembly 26 illustratively includes a single insulating bottom block 34. Those skilled in the art will appreciate that the main lead insulating assembly 26 may include a plurality of insulating bottom blocks arranged to line the bottom portion of the main lead receiving recess 32.

Illustratively, the insulating bottom block 34 is axially secured to the shaft 28 and restricted at least in the axial direction by a projection 36 extending outwardly from a bottom surface of the bottom block. As will be readily appreciated by those skilled in the art, the projection 36 may be a separate piece connected to the bottom surface of the insulating bottom block 34 by an adhesive. Alternatively, the projection 36 may be integrally formed with the insulating bottom block 34, as will also be readily appreciated by one skilled in the art. The projection 36 illustratively extends into a corresponding projection receiving recess 38 in the shaft 28. (FIG. 3.) The projection 36 thereby substantially restricts axial migration of the insulating bottom block 34 as the rotor 30 rotates within the stator 22 and axial forces are applied to the main lead as will be appreciated by those skilled in the art. It will also be readily recognized that a fastener, such as a threaded screw, can alternately or additionally be used to secure the insulating bottom block 34 to the shaft 28.

The main lead insulating assembly 26 also illustratively includes a pair of insulating sidewall blocks 40a, 40b spaced apart from each other and extending outwardly from the insulating bottom block 34. Each insulating sidewall block 40a, 40b is illustratively secured to the insulating bottom block 34. As perhaps best shown in FIG. 2, the blocks are secured by interlocking joints 42 comprising respective mating tabs 41 and recesses 43 in the insulating bottom block 34 and insulating sidewall blocks 40a, 40b. As will be readily appreciated by one skilled in the art, however, other types of interlocking joints and/or fasteners may also be used to secure the insulating bottom block and 34 and each insulating sidewall block 40a, 40b together.

The interlocking joint 42 prevents axial migration of the corresponding insulating sidewall block 40a, 40b relative to the insulating bottom block 34. Accordingly, with the insulating bottom block 34 axially secured to the shaft 22 by the projection 36, each interlocking joint 42 also restricts axial migration of a corresponding insulating sidewall block 40a, 40b.

Each of the insulating blocks 34, 40a, 40b may be made of a material having good insulating properties. As will be readily appreciated by one skilled in the art, such material, for example, may be glass-epoxy.

Referring now more specifically to FIG. 3, the rotor assembly 24 of the dynamoelectric machine 20 illustratively includes at least one securing wedge 44. The at least one securing wedge 44 is illustratively received in an upper portion of the main lead receiving recess 32 and is radially outward from the main lead 35. Illustratively, an insulating layer 45 extends between the at least one securing wedge 44 and the main lead 35 received in the main lead insulating assembly 26

The rotor assembly 24 of the dynamoelectric machine 20 also illustratively includes an axial passageway 46 within the shaft 28 and a radial passageway 48 also within the shaft. The radial passageway 48 is illustratively connected to the axial passageway 46, opening radially outwardly from the shaft 28. An axial lead 50 is received in the axial passageway, and a radial lead 52 is received in the radial passageway 48. The radial lead 52 is connected between the axial lead 50 and the main lead 35.

An additional aspect of the invention relates to a method for installing a main lead 35 for a rotor assembly 34, the rotor assembly including a shaft 28 having a main lead receiving recess 32 in its outer surface and a rotor 30 mounted on the shaft. The method includes lining the main lead receiving recess 32 with a main lead insulating assembly 26. Lining the main lead receiving recess 32 illustratively includes securing at least one insulating bottom block 34 to the shaft 28 to restrict at least axial movement, and securing at least one insulating sidewall block 40 to the at least one insulating bottom block so that it extends outwardly therefrom. The method illustratively also includes positioning the main lead 35 in the main lead insulating assembly 26.

Securing the at least one insulating bottom block 34 illustratively includes providing a projection 36 which is received in a corresponding recess 38 in the shaft 28. Securing the at least one insulating sidewall block 40 comprises securing the at least one insulating sidewall block to the at least one insulating bottom block 34 with at least one interlocking joint 42. The at least one insulating bottom block 34 and insulating sidewall blocks 40a, 40b may each be formed from an insulating material such as glass-epoxy.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A rotor assembly for a dynamoelectric machine comprising:
    a shaft having a main lead receiving recess in an outer surface thereof;
    a rotor mounted to said shaft;
    a main lead insulating assembly lining the main lead receiving recess and comprising
        at least one insulating bottom block axially secured to said shaft so as to restrict at least axial movement, and
        at least one insulating sidewall block secured to said at least one insulating bottom block and extending outwardly therefrom;

and
a main lead received in the main lead insulating assembly.

2. A rotor assembly according to claim 1 wherein said at least one insulating bottom block comprises at least one projection extending radially inwardly; and wherein said shaft has at least one projection receiving recess to receive said at least one projection.

3. A rotor assembly according to claim 1 wherein said at least one insulating sidewall block is secured to said at least one insulating bottom block with at least one interlocking joint.

4. A rotor assembly according to claim 1 wherein said at least one insulating bottom block comprises a single insulating bottom block.

5. A rotor assembly according to claim 1 wherein said at least one insulating sidewall block comprises a pair of spaced apart insulating sidewall blocks.

6. A rotor assembly according to claim 1 wherein said at least one insulating bottom block and said at least one insulating sidewall block each comprises glass-epoxy.

7. A rotor assembly according to claim 1 further comprising at least one securing wedge received in the main lead receiving recess radially outward from said main lead.

8. A rotor assembly according to claim 1 wherein said shaft further has an axial passageway, and a radial passageway connected thru to the axial passageway and opening radially outwardly from said shaft; and further comprising:
   an axial lead received in the axial passageway; and
   a radial lead received in the radial passageway and connected between said axial lead and said main lead.

9. A rotor assembly for a dynamoelectric machine comprising:
   a shaft having a main lead receiving recess in an outer surface thereof;
   a rotor mounted to said shaft;
   a main lead insulating assembly lining the main lead receiving recess and comprising
      at least one insulating bottom block, and
      at least one insulating sidewall block secured to said at least one insulating bottom block with at least one interlocking joint; and
   a main lead received in the main lead insulating assembly.

10. A rotor assembly according to claim 9 further comprising a projection connected to and extending outwardly from said at least one insulating bottom block into an opening formed in said shaft.

11. A rotor assembly according to claim 9 wherein said at least one insulating bottom block comprises a single insulating bottom block.

12. A rotor assembly according to claim 9 wherein said at least one insulating sidewall block comprises a pair of spaced apart insulating sidewall blocks.

13. A rotor assembly according to claim 9 wherein said at least one insulating bottom block and said at least one insulating sidewall block each comprises glass-epoxy.

14. A dynamoelectric machine comprising:
   a shaft having a main lead receiving recess in an outer surface thereof and at least one projection receiving recess in the main lead receiving recess;
   a rotor mounted to said shaft;
   a stator surrounding said rotor;
   a main lead insulating assembly lining the main lead receiving recess and comprising
      at least one insulating bottom block comprising at least one projection received in the at least one projection receiving recess, and
      at least one insulating sidewall block secured to said at least one insulating bottom block with at least one interlocking joint; and a main lead received in the main lead insulating assembly.

15. A dynamoelectric machine according to claim 14 wherein said at least one insulating bottom block comprises a single insulating bottom block.

16. A dynamoelectric machine according, to claim 14 wherein said at least one insulating sidewall block comprises a pair of spaced apart insulating sidewall blocks.

17. A dynamoelectric machine according to claim 14 wherein said at least one insulating bottom block and said at least one insulating sidewall block each comprises glass-epoxy.

18. A method for installing a main lead for a rotor assembly comprising a shaft having a main lead receiving recess in an outer surface thereof and a rotor mounted on the shaft, the method comprising:
   lining the main lead receiving recess with a main lead insulating assembly by
      securing at least one insulating bottom block to the shaft so as to restrict at least axial movement, and
      securing at least one insulating sidewall block to the at least one insulating bottom block and extending outwardly therefrom; and
   positioning the main lead in the main lead insulating assembly.

19. A method according to claim 18 wherein the at least one insulating bottom block comprises at least one projection extending radially inwardly; and wherein securing the at least one insulating bottom block comprises positioning the at least one projection in a projection receiving recess in the shaft.

20. A method according to claim 18 wherein securing the at least one insulating sidewall block comprises securing the at least one insulating sidewall block to the at least one insulating bottom block with at least one interlocking joint.

21. A method according to claim 18 wherein the at least one insulating bottom block and the at least one insulating sidewall block each comprises glass-epoxy.

* * * * *